(12) United States Patent
Kim

(10) Patent No.: US 12,146,748 B2
(45) Date of Patent: Nov. 19, 2024

(54) POWER MANAGEMENT APPARATUS AND VEHICLE HAVING THE SAME

(71) Applicants: Hyundai Motor Company, Seoul (KR); Kia Corporation, Seoul (KR)

(72) Inventor: Taesung Kim, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 226 days.

(21) Appl. No.: 17/818,740

(22) Filed: Aug. 10, 2022

(65) Prior Publication Data

US 2023/0168091 A1    Jun. 1, 2023

(30) Foreign Application Priority Data

Dec. 1, 2021   (KR) .......................... 10-2021-0169822

(51) Int. Cl.
*G01C 21/34* (2006.01)
*B60H 1/00* (2006.01)
(Continued)

(52) U.S. Cl.
CPC ..... *G01C 21/3407* (2013.01); *B60H 1/00771* (2013.01); *B60J 1/2011* (2013.01);
(Continued)

(58) Field of Classification Search
CPC ....................... G01C 21/3407; G01C 21/3697; G01C 21/36; G01C 21/3691; B60H 1/00771;
(Continued)

(56) References Cited

U.S. PATENT DOCUMENTS

2003/0042398 A1* 3/2003 Su ......................... B60Q 1/1423
                                                           250/205
2006/0100778 A1* 5/2006 Lee ..................... G01C 21/3415
                                                           701/414
(Continued)

FOREIGN PATENT DOCUMENTS

| CN | 109077595 A | * | 12/2018 | ............... A47H 5/02 |
| CN | 110737213 A | * | 1/2020 | ............. G05B 19/04 |
| JP | H031648 Y2 | * | 1/1991 | ............. F16H 19/04 |
| KR | 20060030135 A | * | 4/2006 | ............. B60J 1/2011 |

OTHER PUBLICATIONS

"Automation Triggers Are the First Step in Automation. So What Are they, Exactly?" by A. Park from https://tray.io/blog/automation-triggers-are-the-first-step-in-automation Archived at the Wayback Machine Sep. 23, 2019 (Year: 2019).*

(Continued)

*Primary Examiner* — Peter D Nolan
*Assistant Examiner* — Tanya C Sienko
(74) *Attorney, Agent, or Firm* — MCDONNELL BOEHNEN HULBERT & BERGHOFF LLP

(57) ABSTRACT

Provided is a vehicle including a curtain device; an inputter; a communicator configured to recognize current position information; and a processor configured to determine whether a current position is a position before entering a tunnel based on the current position information and map information, and upon determining that the current position is the position before entering the tunnel, control to open the curtain device, and configured to, in response to a selection command of an automatic light on/off mode for automatically turning on a lamp being received through the inputter, change an opening/closing mode of the curtain device to an automatic opening/closing mode, and upon the lamp being in an on-state, control opening of the curtain device.

18 Claims, 7 Drawing Sheets

(51) Int. Cl.
*B60J 1/20* (2006.01)
*B60Q 1/04* (2006.01)
*B60W 60/00* (2020.01)
*G06V 20/59* (2022.01)
*G06V 20/68* (2022.01)

(52) U.S. Cl.
CPC .............. *B60Q 1/04* (2013.01); *B60W 60/00* (2020.02); *G06V 20/59* (2022.01); *G06V 20/68* (2022.01); *B60W 2420/40* (2013.01); *B60W 2420/403* (2013.01); *B60W 2520/00* (2013.01); *B60W 2540/221* (2020.02); *B60W 2555/20* (2020.02)

(58) Field of Classification Search
CPC ..... B60H 1/00849; B60J 1/2011; B60J 3/002; B60Q 1/04; B60Q 1/1423; B60Q 1/50; B60W 60/00; B60W 2420/40; B60W 2420/403; B60W 40/02; B60W 40/08; B60W 40/105; B60W 60/001; G06V 20/59; G06V 20/68; B60R 16/023; F16H 59/105
See application file for complete search history.

(56) References Cited

U.S. PATENT DOCUMENTS

| | | | |
|---|---|---|---|
| 2015/0126806 A1* | 5/2015 | Barroso | H05B 47/11 315/153 |
| 2019/0381868 A1* | 12/2019 | Chessum | B60J 1/2091 |
| 2021/0129857 A1* | 5/2021 | Cullinane | B60R 22/48 |

OTHER PUBLICATIONS

Entry from www.dictionary.com: "Highway", archived at the Wayback Machine Jun. 22, 2019 (Year: 2019).*
Machine translation of CN110737213 off Espacenet downloaded Jun. 1, 2024 (Year: 2024).*
Machine translation of JP H031648 Y2 off Search downloaded May 28, 2024 (Year: 2024).*
"An IOT Automated Curtain System for Smart Homes" by L. Souza et al., ICACCI conference Sep. 19, 2018-Sep. 22, 2018, published Sep. 1, 2018 (Year: 2018).*
Machine translation of KR 2006-0030135-A downloaded from IP.com May 31, 2024 (Year: 2024).*
Machine translation of CN 109077595 A downloaded from IP.com May 31, 2024 (Year: 2024).*

* cited by examiner

POWER MANAGEMENT APPARATUS AND VEHICLE HAVING THE SAME

CROSS-REFERENCE TO RELATED APPLICATIONS

This application is based on and claims priority under 35 U.S.C. § 119 to Korean Patent Application No. 10-2021-0169822, filed on Dec. 1, 2021 in the Korean Intellectual Property Office, the disclosure of which is incorporated herein by reference.

TECHNICAL FIELD

The present disclosure relates to a vehicle having a curtain device that is closed to block sunlight and opened to secure a view.

BACKGROUND

There are vehicles including a curtain device for blocking incident sunlight as a convenience device.

The curtain device may be provided on a window of a rear door or on a rear windshield glass.

Curtain devices of today may be electrically opened and closed in response to a user command through a switch operation.

When using such an electric curtain device, the user manually manipulates the switch when entering a tunnel or travelling at night to open the curtain device to secure a rear view through a rearview mirror, and manually manipulates the switch when exiting from a tunnel or travelling during the daytime to close the curtain device.

The convention curtain devices are cumbersome to use because users need to directly manipulate the switch.

Accordingly, there is a demand for a technology of automatically opening and closing a curtain device to improve the travelling safety and user convenience.

SUMMARY

Therefore, it is an object of the disclosure to provide a vehicle capable of automatically opening a curtain device when travelling at night or travelling in a tunnel.

It is another object of the disclosure to provide a vehicle capable of automatically closing a curtain device based on biometric information of a user.

It is another object of the disclosure to provide a vehicle capable of automatically closing a curtain device based on loading information of food items.

The technical objectives of the disclosure are not limited to the above, and other objectives may become apparent to those of ordinary skill in the art based on the following descriptions.

According to an aspect of the disclosure, there is provided a vehicle including: a curtain device; a communicator configured to recognize current position information; a processor configured to determine whether a current position is a position before entering a tunnel based on the current position information and map information; and control to open the curtain device, upon determining that the current position is the position before entering the tunnel.

The vehicle may further include an inputter, wherein the processor may be configured to generate route information from the current position to a destination based on destination information input to the inputter and the current position information, and determine whether the current position is the position before entering the tunnel based on the generated route information, the current position information, and the map information.

The processor may be configured to: upon a selection command for an autonomous driving mode being received through the inputter, determine whether the current position is a highway based on the route information, the map information, and the current position information, and upon determining that the current position is the highway, control to execute autonomous driving and change an opening/closing mode of the curtain device to an automatic opening/closing mode during the autonomous driving.

The vehicle may further include velocity detector configured to detect a travelling velocity and output velocity information regarding the detected travelling velocity, wherein the processor is configured to: upon determining that the current position is the position before entering the tunnel, acquire distance information regarding a distance to an entrance of the tunnel based on the current position information and the map information; acquire expected time information taken to reach the entrance of the tunnel based on the travelling velocity information and the acquired distance information; and control opening of the curtain device based on the acquired expected time information.

The vehicle may further include an inputter, wherein the processor may be configured to, upon a selection command of an automatic light on/off mode for automatically turning on a lamp being received through the inputter, change an opening/closing mode of the curtain device to an automatic opening/closing mode.

The vehicle may further include an inputter, wherein the processor may be configured to, upon an automatic circulation mode for automatically changing a circulation mode of an air conditioner being received through the inputter, change an opening/closing mode of the curtain device to an automatic opening/closing mode, and wherein the circulation mode of the air conditioner may include an indoor air circulation mode and an outdoor air circulation mode.

The vehicle may further include an inputter and an illuminance sensor, wherein the processor may be configured to: upon a selection command of an automatic opening/closing mode of the curtain device being received through the inputter, determine whether an external illuminance is less than a reference illuminance based on illuminance information detected by the illuminance sensor, and upon determining that the external illuminance is less than the reference illuminance, control opening of the curtain device.

The vehicle may further include a biometric sensor, wherein the processor may be configured to determine whether a user is in a sleep state based on a biometric signal detected by the biometric sensor, and upon determining that the user is in the sleep state, determine whether the external illuminance is higher than or equal to the reference illuminance based on the illuminance information detected by the illuminance sensor, and upon determining that the external illuminance is higher than or equal to the reference illuminance, control closing of the curtain device.

The processor may be configured to, upon a signal of a shift lever being received, determine a shift stage corresponding to the signal of the shift lever, and upon determining that the shift stage is a reverse stage, control opening of the curtain device.

The vehicle may further include a camera, wherein the processor may be configured to: determine whether the current position is a shopping place based on the current position information; upon determining that the current position is the shopping place, determine whether a food item is loaded based on image information of the camera; and in response to a state in which the food item is loaded, control closing of the curtain device.

The processor may be configured to determine whether a current time is a day time or a night time based on date information and time information, and upon determining that the current time is the night time, control opening of the curtain device.

According to another aspect of the disclosure, there is provided a vehicle including: a curtain device; a lamp; an inputter; and a processor configured to, upon a selection command of an automatic light on/off mode for automatically turning on the lamp being received through the inputter, change an opening/closing mode of the curtain device to an automatic opening/closing mode, and upon the lamp being in a light on-state, control opening of the curtain device.

The vehicle may further include a communicator for acquiring current position information, wherein the processor may be configured to, determine whether a current position is a position before entering a tunnel based on the current position information and map information, and upon determining that the current position is the position before entering the tunnel, control to open the curtain device.

The vehicle may further include an air conditioner for performing an indoor air circulation mode and an outdoor air circulation mode, wherein the processor may be configured to, upon determining that the current position is the position before entering the tunnel, change an air circulation mode of the air conditioner from the outdoor air circulation mode to the indoor air circulation mode.

The processor may be configured to, upon an automatic opening/closing command of the curtain device being received through the inputter, control opening of the curtain device in response to the lamp being turned on, and control closing of the curtain device in response to the lamp being turned off.

The vehicle may further include an illuminance sensor configured to detect an illuminance and to output illuminance information related to the detected illuminance, wherein the processor may be configured to, upon an automatic opening/closing command of the curtain device being received through the inputter, determine whether the detected illuminance is less than a reference illuminance based on the illuminance information detected by the illuminance sensor, and upon determining that the detected illuminance is less than the reference illuminance, control opening of the curtain device.

The vehicle may further include a biometric sensor, wherein the processor may be configured to determine whether a user is in a sleep state based on a biometric signal detected by the biometric sensor, upon determining that the user is in the sleep state, determine whether an external illuminance is higher than or equal to a reference illuminance based on the illuminance information detected by the illuminance sensor, and upon determining that the external illuminance is higher than or equal to the reference illuminance, control closing of the curtain device.

The processor may be configured to, upon a signal of a shift lever being received, determine a shift stage corresponding to the signal of the shift lever, and upon determining that the shift stage is a reverse stage, control opening of the curtain device.

The vehicle may further include a camera, wherein the processor may be configured to: determine whether a food item is loaded based on image information of the camera; and in response to a state in which the food item is loaded, control closing of the curtain device.

The vehicle may further include a communicator for acquiring current position information. The processor may be configured to, upon a selection command for an autonomous driving mode being received through the inputter, determine whether a current position is a highway based on map information, and the current position information, and upon determining that the current position is the highway, control to execute autonomous driving, and change the opening/closing mode of the curtain device to the automatic opening/closing mode upon the autonomous driving.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
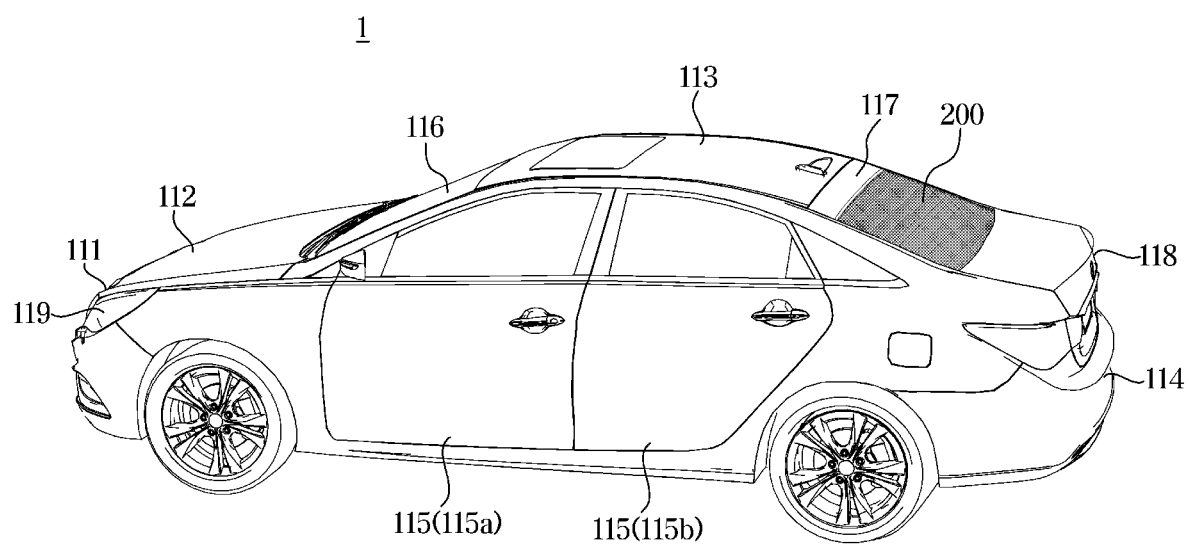
FIG. 1 is a view illustrating an exterior of a vehicle according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

Figure 2:
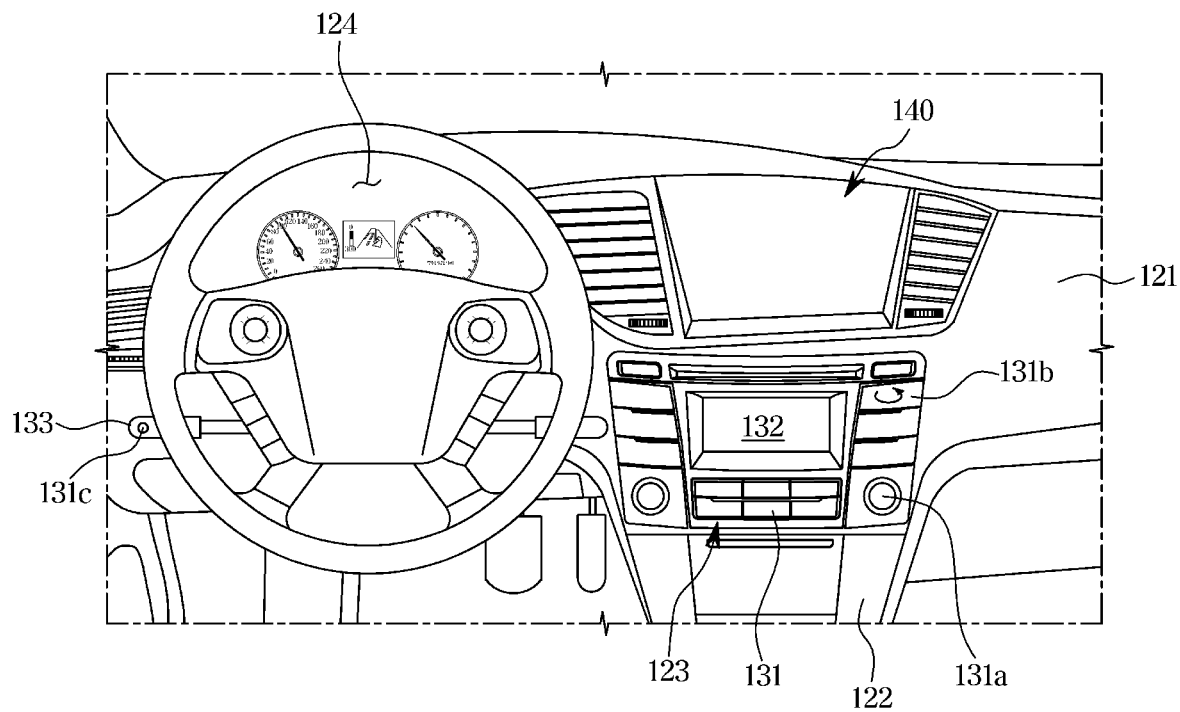
FIG. 2 is a view illustrating an interior of a vehicle according to an embodiment.

FIG. 1 is a view illustrating an exterior of a vehicle according to an embodiment, and FIG. 2 is a view illustrating an interior of a vehicle according to an embodiment.

Referring to FIG. 1, a vehicle 1 includes a body having an interior and an exterior, and a chassis which is a part of the vehicle 1 except for the body, in which mechanical devices required for travelling are installed.

The exterior of the body includes a front panel 111, a bonnet 112, a roof panel 113, a rear panel 114, and a plurality of doors 115 for opening and closing an indoor space in which a person may sit, and includes a plurality of window glasses (also referred to as "windows") provided in the plurality of doors, respectively, so as to be openable and closeable.

The plurality of doors 115 may include doors 115a for front seats, that is, a driver's seat and a passenger seat and doors 115b for rear seats, that is, a rear left seat and a rear right seat.

The plurality of window glasses may include a side window glass and a quarter window glass installed between pillars without being openable/closeable.

The vehicle may include a front windshield glass 116 installed on the front side of the vehicle and a rear windshield glass 117 installed on the rear side of the vehicle.

The rear windshield glass 117 may be provided with a curtain device 200 for blocking sunlight or securing a rear view.

In addition, the window glass of the door provided in the passenger seat and the side window provided in the door of the rear seat may also be provided with curtain devices 200.

The vehicle 1 includes a tailgate 118 for opening and closing a trunk that forms a space for storing luggage, and a lamp 119 for enabling easy viewing of information about a surrounding of the vehicle while keeping an eye on the front, and performing signaling and communication functions to other vehicles and pedestrians.

Referring to FIG. 2, the interior of the body includes a seat on which an occupant sits, a dashboard 121, a center fascia 122 in which an air vent of an air conditioner and a control plate are disposed, a head unit 123 provided in the center fascia 122 and receiving operation commands of an audio device, a heating wire of a seat, and an air conditioner, and a cluster (i.e., an instrument cluster) 124 disposed on the dashboard 121 and guiding travelling functions, such as a vehicle velocity, an engine rotation speed, a fuel quantity, a coolant, etc., and vehicle information.

The head unit 123 may be provided with an inputter 131 for a user's input and a display 132 for displaying information about functions being operated in the vehicle.

The inputter 131 may include a plurality of buttons.

For example, the plurality of buttons may further include an automatic opening/closing button 131a for automatically opening and closing the curtain device 200 and a circulation mode button 131b for receiving an air circulation setting mode of the air conditioner.

Here, the air circulation setting mode includes an outdoor air circulation mode in which air outside the vehicle is introduced into the interior, and an indoor air circulation mode in which air outside the vehicle is prevented from being introduced into the interior and only air inside the vehicle is circulated.

The vehicle may further include an automatic circulation button for automatically changing the indoor air circulation mode and the outdoor air circulation mode.

The vehicle may, in response to receiving an automatic circulation command corresponding to an on-selection of the automatic circulation button, allow air circulation to be automatically performed, and in response to receiving a manual circulation command corresponding to an off-selection of the automatic circulation button, allow air circulation to be manually performed.

The receiving of the automatic circulation command may include receiving an on-signal of an automatic circulation command, and the receiving of the manual circulation command may include receiving an off-signal of an automatic circulation command.

The vehicle may, in response to receiving an automatic opening/closing command corresponding to an on-selection of the automatic opening/closing button, allow the curtain device 200 to be automatically opened and closed, and in response to receiving a manual opening/closing command corresponding to an off-selection of the automatic opening/closing button, allow the curtain device 200 to be manually opened and closed.

The receiving of the automatic opening/closing command may include receiving an on-signal of an automatic opening/closing command, and the receiving the manual opening/closing command may include receiving an off-signal of an automatic opening/closing command.

The vehicle may further include a lamp lever 133 for instructing an on-operation of a head (light) lamp, a fog lamp, and a direction indicator lamp. The lamp lever 133 may be provided with an automatic light on/off button 131c for selecting an automatic light on/off mode for instructing automatic lighting of the lamp.

The vehicle may, in response to receiving an automatic light on/off command corresponding to an on-selection of the automatic light on/off button, allow the lamp to be automatically turned on or turned off, and in response to receiving a manual light on/off command corresponding to an off-selection of the automatic light on/off button, allow the lamp to be turned on or off manually.

The receiving of the automatic light off/off command may include receiving an on-signal of an automatic light on/off command, and the receiving of the manual light on/off command may include receiving an off-signal of an automatic light on/off command.

In addition, the inputter 131 may be provided on the center fascia 122 as well as the head unit 123, and may be provided on the steering wheel or adjacent to the steering wheel, and may be provided on the armrest or handle on the inside of the door, or may be provided on each sheet. The inputter 131 may include at least one physical mechanism, such as an on/off button for various functions, and a button, a key, a switch, and the like for changing setting values of various functions.

The cluster 124 may be implemented in a digital manner. The digital cluster displays vehicle information and travelling information as images.

The interior of the body may include a navigation device (AVN) or a terminal 140 capable of communication (i.e., a vehicle terminal) in which a navigation application is installed. The terminal 140 may comprehensively perform a digital multimedia broadcasting (DMB) function, an audio function, a video function, a navigation function, and the like.

The terminal 140 may provide the processor 180 with navigation information when performing a navigation function.

Here, the navigation information may include terrain information within a certain range from the current position, and may further include position information of a tunnel in the terrain information.

In addition, the navigation information may include terrain information based on route information to a destination.

The terminal 140 may include a display and may further include an inputter. The inputter of the terminal is described as a second inputter to be distinguished from the inputter provided in the head unit or vehicle, and the display of the terminal is described as a second display to be distinguished from the display provided in the head unit.

In addition, the inputter provided in the head unit is described as a first inputter and the display provided in the head unit is described as a first display.

Figure 3:
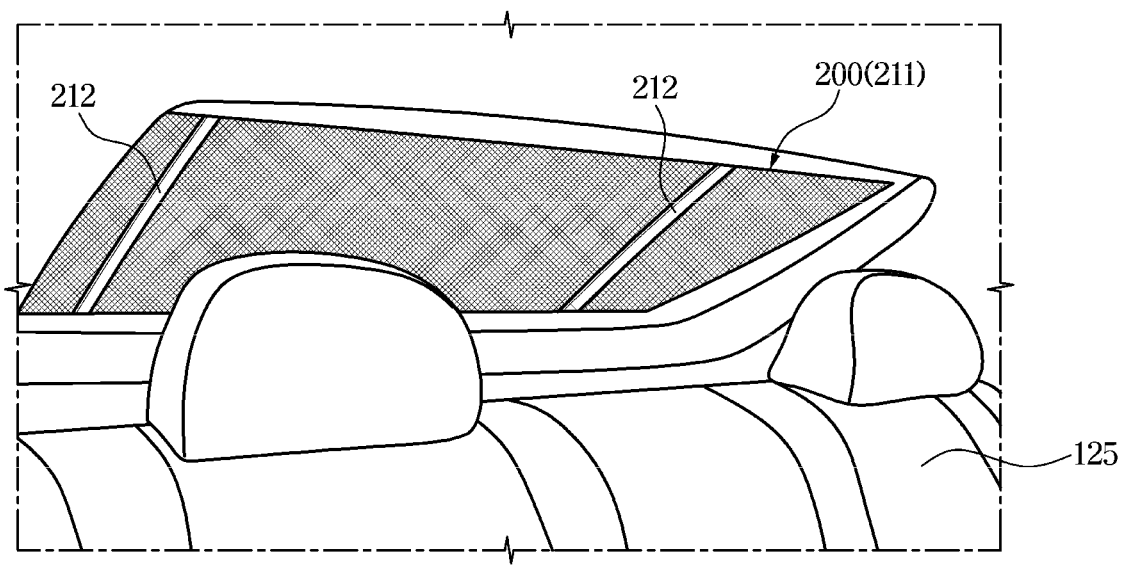
FIG. 3 is a view illustrating a curtain device provided on a rear windshield glass of a vehicle according to an embodiment.

The second display of the terminal may be implemented as a flat display panel, such as a liquid crystal display (LCD), a plasma display panel (PDP), or an organic light emitting diode (OLED), and the second inputter may be implemented as a touch panel integrally formed with the flat display panel. That is, the terminal 140 may be implemented in the form of a touch screen. FIG. 3 is a view illustrating a curtain device provided on a rear windshield glass of a vehicle according to an embodiment.

The curtain device 200 may be provided inside the vehicle.

The curtain device 200 may be provided behind the rear seat 125 inside the vehicle, in detail, on the rear windshield glass 117.

When the vehicle is provided as a van, such as a sport utility vehicle (SUV), the curtain device 200 may be provided on the tailgate.

The curtain device 200 may move up and down along the surface direction of the rear windshield glass 117. For example, when changing from a closed state to an open state, the curtain device 200 may move from an upper side to a lower side of the rear windshield glass 117. When changing from the open state to the closed state, the curtain device 200 may move from the lower side to the upper side of the rear windshield glass 117.

The curtain device 200 may include a curtain member 211 for blocking light incident from the rear of the vehicle.

The curtain device 200 includes bars 212 positioned on both sides of the curtain member 211 to enable movement of the curtain member 211, a motor 213 (shown in FIG. 4) for folding the bars 212 to enable the vertical movement of the curtain member 211, and a gear (not shown) for adjusting the driving force of the motor 213.

The vehicle may include an advanced driver assistance system (ADAS) for assisting the driver in manipulating (driving, braking, and steering) the vehicle 1.

For example, the ADAS may detect the environment around the vehicle 1 (e.g., other vehicles, pedestrians, cyclists, lanes, road signs, etc.) and in response to the detected environment, control the driving and/or braking and/or steering of the vehicle 1.

The ADAS may provide the driver with a lane departure warning (LDW), a lane keeping assist (LKA), a high beam assist (HBA), an automatic emergency braking (AEB), a traffic sign recognition (TSR), a smart cruise control (SCC), a blind spot detection (BSD), and the like.

The ADAS may include an autonomous driving control device that allows the vehicle to automatically travel to the destination by recognizing the road environment, determining obstacles and travelling conditions, and controlling the travelling of the vehicle according to a planned travelling route while avoiding obstacles.

The ADAS may include a highway driving assist (HAD) device that controls autonomous driving on a highway, high-speedy road, or the like.

Figure 4:
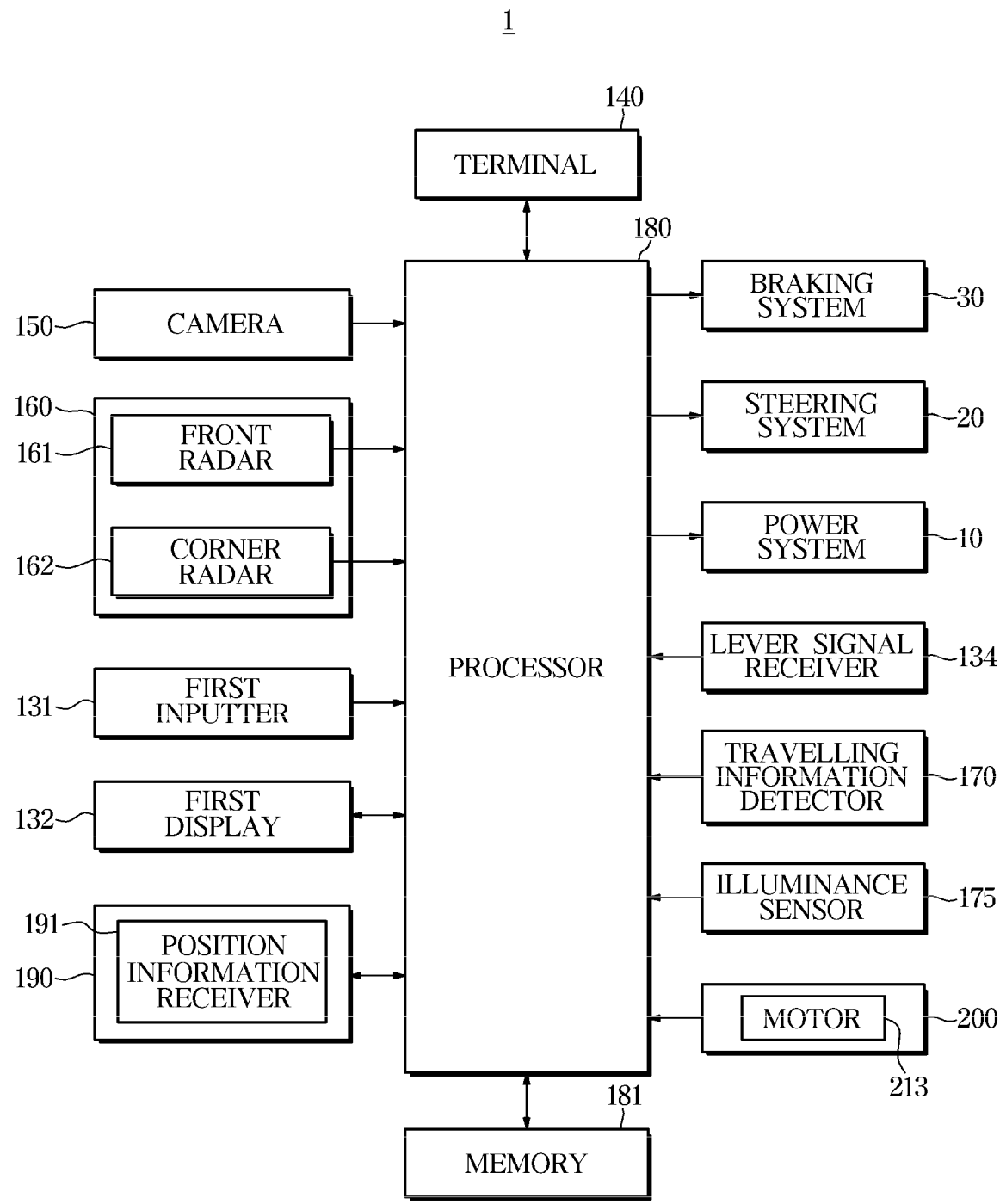
FIG. 4 is a control block diagram illustrating a vehicle according to an embodiment.

FIG. 4 is a control block diagram illustrating a vehicle according to an embodiment.

The vehicle 1 includes a power system 10, a steering system 20, a braking system 30, a first inputter 131, a first display 132, a terminal 140, a camera 150, an obstacle detector 160, a travelling information detector 170, an illuminance sensor 175, a processor 180, a memory 181, a communicator 190, and a curtain device 200.

The power system 10 may generate power for travelling of the vehicle 1.

The power system 10 of an internal combustion engine vehicle may include an engine. For example, the power system 10 may control the engine in response to an accelerating intention of a driver via an accelerator pedal or a request from the ADAS.

The power system 10 of an eco-friendly vehicle may include a driving motor and a battery.

The steering system 20 changes the travelling direction of the vehicle 1 in response to a steering intention of a driver through the steering wheel.

The steering system may include an electronic steering control device that decreases the steering force when travelling at a low velocity or parking, and increases the steering force when travelling at a high velocity.

The braking system 30 may decelerate the vehicle 1 or stop the vehicle 1 through friction with the wheels.

The braking system 30 may generate a braking force in response to a braking intention of a driver via a brake pedal and/or slip of the wheels.

The vehicle may further include a shift lever.

The shift lever may receive information about a shift stage and output the received information about the shift stage. Here, the shift stage may include a parking stage, a reverse stage, a forward stage, and a neutral stage.

The shift lever may transmit power generated by the power system 10 to the wheels.

The vehicle may control the transmission in response to a shift command of a driver through the shift lever and/or the travelling velocity of the vehicle 1. For example, the vehicle may adjust a shift ratio from the engine to the wheels in response to a shift command.

The vehicle may further include a biometric sensor provided on each of a plurality of seats in the vehicle and configured to detect a biometric signal of a user (or an occupant).

The first inputter 131 receives a user input. That is, the first inputter 131 may receive an operation command of various functions that are performable in the vehicle according to a user command.

The first inputter 131 may receive an on-off command of an autonomous driving mode, an automatic circulation command, an automatic light on/off command, and an automatic opening/closing command.

The first inputter 131 may receive an operation command of at least one of a navigation mode or a map display mode.

The first inputter 131 may receive destination information in a navigation mode or an autonomous driving mode.

The first inputter 131 may also receive a movement command and a selection command of a cursor displayed on the terminal 140.

The first display 132 displays information about a function being performed in the vehicle and information input by the user.

The first display 132 may receive automatic travelling mode on/off information, automatic circulation information, automatic light on/off information, and automatic opening/closing information.

The first display 132 may display state information related to the current state of the lamp and the current state of the curtain device 200.

The first display 132 may include a cluster.

A lever signal receiver 134 receives a signal of the lamp lever 133. That is, the lever signal receiver 134 may receive an on-signal of the lamp or an off-signal of the lamp, and transmit the received signal to the processor 180.

The terminal 140 displays information about an audio function, a video function, a navigation function, a DMB function, and a radio function.

The terminal 140 may display autonomous driving control information and may also display images of surroundings of the vehicle in an autonomous driving mode.

The terminal 140 may, in a map display mode, display a map image within a predetermined range from the current position of the vehicle, and in a navigation mode, display map information to which route information from the current position to the destination is matched and displays road guidance information.

In the embodiment, the vehicle terminal may represent a navigation device that mainly performs navigation.

The terminal 140 may include only the second display.

The terminal 140 may include the second inputter and the second display. In this case, the terminal 140 may be provided as a touch screen in which the touch panel and the display panel are integrally formed with each other.

The camera 150 acquires image data of the surrounding of the vehicle 1 and image information of the road. The camera 150 may photograph the front of the vehicle 1 and recognize other vehicles, pedestrians, cyclists, lanes, road signs, and the like.

The camera 150 may include a plurality of lenses and an image sensor. The image sensor may include a plurality of photodiodes for converting light into electrical signals, and the plurality of photodiodes may be arranged in a two-dimensional matrix.

The camera 150 may be provided in one unit or a plurality of units thereof.

The camera 150 may include at least one of a front camera for acquiring an image of a road in front of the vehicle and a rear camera for acquiring an image of a road behind the vehicle.

Here, the front camera may be provided on the window glass of the front of the vehicle inside the vehicle, or provided on the front panel, the rear mirror inside the vehicle, or provided on the roof panel to be exposed to the outside, or provided on a license plate, a grille on the front of the vehicle, or an emblem on the front of the vehicle. The front camera provided on the roof panel may have a field of view directed to the front of the vehicle.

The rear camera may be provided on the window glass at the rear of the vehicle inside the vehicle, or provided on a rear panel, a tail gate side, a license plate on the rear of the vehicle, an emblem on the rear of the vehicle, or the roof panel to be exposed to the outside. The rear camera provided on the roof panel may have a field of view directed to the rear of the vehicle.

The camera 150 may include a charge-coupled device (CCD) or a complementary metal-oxide semiconductor (CMOS) image sensor, and may include a 3D spatial recognition sensor, such as a KINECT (RGB-D sensor), a TOF (Structured Light Sensor), or a stereo camera.

The obstacle detector 160 acquires obstacle information of the surrounding of the vehicle 1.

The vehicle may acquire the relative position, relative velocity, etc. of obstacles (e.g., other vehicles, pedestrians, cyclists, etc.) around the vehicle 1 from obstacle data.

The obstacle detector 160 may include a front radar 161 and a plurality of corner radars 162.

The front radar 161 may have a field of sensing directed to the front of the vehicle 1. The front radar 161 may be installed, for example, in a grille or a bumper of the vehicle 1

The front radar 161 may include a transmission antenna (or a transmission antenna array) that radiates transmission radio waves to the front of the vehicle 1 and a reception antenna (or a reception antenna array) that receives reflection radio waves reflected from an object.

The front radar 161 may acquire front radar data from the transmission radio waves transmitted by the transmission antenna and the reflection radio waves received by the reception antenna.

The front radar data may include position information and velocity information regarding another vehicle, a pedestrian, or a cyclist existing in front of the vehicle 1.

The front radar 161 may calculate the relative distance to the obstacle based on the phase difference (or time difference) between the transmission radio waves and the reflection radio waves, and calculate the relative velocity of the obstacle based on the frequency difference between the transmission radio waves and the reflected radio waves.

The plurality of corner radars 162 include a first corner radar installed on the front right side of the vehicle 1, a second corner radar installed on the front left side of the vehicle 1, a third corner radar installed on the rear right side of the vehicle 1, and a fourth corner radar installed on the rear left side of the vehicle 1.

The plurality of corner radars 162 may calculate the relative velocity of the obstacle on the same principle as the front radar 161.

The obstacle detector 160 may further include at least one of a light detection and ranging (LiDAR) sensor or an ultrasonic sensor.

The travelling information detector 170 detects travelling information of the vehicle 1. The travelling information may represent information related to a travelling velocity, a travelling direction, and a travelling distance of the vehicle.

The travelling information detector 170 may include a velocity detector configured to detect a travel velocity of the vehicle 1.

The velocity detector may include a plurality of wheel velocity sensors provided on the plurality of wheels of the vehicle, respectively, and may include an acceleration sensor.

The travelling information detector 170 may further include a steering angle detector configured to detect an angle of the steering wheel. The travelling information detector 170 may include a yaw rate detector.

The illuminance sensor 175 detects an external illuminance and outputs illuminance information about the detected illuminance.

The processor 180 may, in a navigation mode or an autonomous driving mode, generate a route from the current position to the destination based on current position information received by the position receiver 191 and destination information, and control travelling with the generated route.

When a plurality of routes are generated, the processor 180 may control travelling based on information about a route selected by the inputter 131 among the plurality of routes.

The processor 180 may generate navigation information by matching the generated route information and the current position information to map information, and control the terminal 140 to display the generated navigation information.

The processor 180 may control the vehicle to travel at a target travelling velocity during the autonomous driving mode. Here, the target travelling velocity may be a preset travelling velocity or a travelling velocity input by a user.

The processor 180 may communicate with the travelling information detector 170 in the autonomous driving mode, and control autonomous driving based on the travelling information detected by the travelling information detector 170 and navigation information.

The processor 180 controls travelling based on navigation information, specifically, based on information about roads and obstacles (i.e., other vehicles).

The processor 180 may, in an autonomous driving mode, process front image information of the camera, front radar data of the front radar 161, and corner radar data of the plurality of corner radars 162, and generate a braking signal and a steering signal for controlling the braking system and the steering system 20, and generate a power signal for controlling the power system 10.

The processor 180 may recognize obstacles in front of the vehicle 1 based on the front image data of the camera 150 and the front radar data of the front radar 161, and may acquire position information (direction) and type information (e.g., whether the obstacle is another vehicle, a pedestrian, a cyclist, a cub, a guard rail, a roadside tree, a street lamp, or the like) of the recognized obstacles.

In detail, the processor 180 may acquire position information (distance and direction) and velocity information (relative velocity) of the obstacles in front of the vehicle 1 based on the front radar data of the front radar 161.

In addition, the processor 180 may match the obstacles detected by the front image data with the obstacles detected by the front radar data, and acquire the type information, the position information, and the velocity information of the obstacles in front of the vehicle 1 based on a result of the matching.

The processor 180 may generate a braking signal and a steering signal based on the type information, the position information, and the velocity information of the front obstacles.

For example, the processor 180 may calculate a time to collision (TTC) between the vehicle 1 and the front obstacle based on the position information (relative distance) and the velocity information (relative velocity) of the front objects, and based on a result of comparing the TTC with a predetermined reference time, warn the driver of a collision, transmit a braking signal to the braking system 30, or transmit a steering signal to the steering system 20.

The processor 180 may calculate a distance to collision (DTC) based on the velocity information (relative velocity) of front objects, and based on a result of comparing the DTC with distances to the front objects, warn the driver of a collision or transmit a braking signal to the braking system 30.

The processor 180 may recognize obstacles on the sides of the vehicle 1 (front right, front left, rear right, and rear left) based on corner radar data of the plurality of corner radars 162, and acquire position information (distance and direction) and velocity information (relative velocity) of the recognized obstacles.

The processor 180 may, in response to receiving image information of the road, perform image processing on the image information to recognize lane lines of the road, and recognize a lane in which the vehicle travels based on position information of the recognized lane lines.

The processor 180 may generate a tracking line based on information about the recognized lane, and information transmitted from the camera 150, the obstacle detector 160, and the travelling information detector 170, generate a travelling path based on the position of the generated tracking line, and control autonomous driving along the generated travelling path.

The tracking line is a line for allowing the center of the body to follow one position on the lane. Here, the one position on the lane may be represent the position of one of two lane lines constituting the lane, or the position in the middle between the two lane lines.

The processor 180 may, in response to receiving an on-command of a highway travel assistance mode, change the opening/closing mode of the curtain device 200 to the automatic opening/closing mode.

The processor 180 may, in response to receiving a selection command of an automatic light on/off mode for automatically turning on the lamp 119, change the opening/closing mode of the curtain device 200 to the automatic opening/closing mode.

The processor 180 may, in response to receiving an automatic circulation mode for automatically changing the circulation mode of the air conditioner, change the opening/closing mode of the curtain device to the automatic opening/closing mode.

The processor 180 may, in response to receiving the on-command of the highway travelling assistance mode, determine whether the current position is a highway based on current position information and road information, and upon determining that the current position is a highway, perform highway travel assistance based on route information to the destination, image information of the camera, and obstacle information of the obstacle detector.

The processor 180 may, upon determining that the current position is not a highway, control travelling while performing steering acceleration and braking in response to a drive intention of the user.

The processor 180 may, in response to receiving the on-command of the automatic light on-off mode through the first inputter 131, perform the automatic light on-off mode for the lamp. Here, the on-command of the automatic light on/off mode may represent an automatic light on/off command.

The processor 180 may, when performing the automatic light on-off mode, check whether the external illuminance is less than a reference illuminance based on illuminance information detected by the illuminance sensor and control turning on of the lamp upon determining that the external illuminance is less than the reference illuminance and, upon determining that the external illuminance is equal to or higher than the reference illuminance, control turning off of the lamp.

The processor 180 may, in response to receiving the on-command of the automatic circulation mode through the first inputter 131, perform the automatic circulation mode of the air conditioner. Here, the on-command of the auto circulation mode may represent an automatic circulation command.

The processor 180 may, when performing the automatic circulation mode, change the outdoor air circulation mode to the indoor air circulation mode upon determining that the current position is an entrance position of a tunnel, and upon determining that the current position is an exit position of a tunnel, change the indoor air circulation mode to the outdoor air circulation mode.

The processor 180 may, in response to receiving the on-command of the automatic opening/closing mode through the first inputter 131, perform the automatic opening/closing mode for the curtain device 200. Here, the on-command of the automatic opening/closing mode may represent an automatic opening/closing command.

The processor 180 may, in response to receiving an off-command of the automatic opening/closing mode through the first inputter 131, perform a manual opening/closing mode for the curtain device 200. Here, the off-command of the automatic opening/closing mode may include a manual opening/closing mode command.

The processor 180 may, when performing the manual opening/closing mode, control opening of the curtain device 200 in response to an opening command of the user, and may control closing of the curtain device 200 in response to a closing command of the user.

The processor 180 may, when performing the automatic opening/closing mode, automatically open or close the curtain device 200 based on at least one of the highway travel assistance mode, the external illumination, the automatic light on/off mode, or the automatic circulation mode.

The processor 180 may also, when performing the automatic opening/closing mode, automatically open or close the curtain device 200 based on a user sleep mode or a food loading mode.

The configuration of the processor 180 will be described in more detail.

(1) Automatic opening/closing mode-ON

The processor 180 may determine whether an on-command of the automatic opening/closing mode is received, and upon determining that the on-command of the automatic opening/closing mode is received, control opening and closing of the curtain device 200 based on a tunnel entry, an external illuminance, an automatic circulation mode, and an automatic light on-off mode.

In a situation to open the curtain device 200, the processor 180 may, upon the current state of the curtain device 200 being an open state, maintain the state of the curtain device 200 and in response to the current state of the curtain device being a closed state, control the motor to open the curtain device 200.

In a situation to close the curtain device 200, the processor 180 may, upon the current state of the curtain device being a closed state, maintain the state of the curtain device, and upon the current state of the curtain device being an open state, control the motor to close the curtain device 200.

(1.1) The processor 180 determines whether the current position is the position before entering a tunnel based on current position information, route information, and road information, and controls opening of the curtain device 200 upon determining that the current position is the position before entering the tunnel, and controls closing of the curtain device upon determining that the current position is the position after exiting from the tunnel.

Here, the position information before entering the tunnel and the position information after exiting from the tunnel may be previously stored information.

The position information before entering the tunnel may include information about a position spaced apart by a preset distance from the entrance position of the tunnel, and the position information after exiting from the tunnel may include information about a position spaced apart by a preset distance from the exit position of the tunnel.

Figure 5:
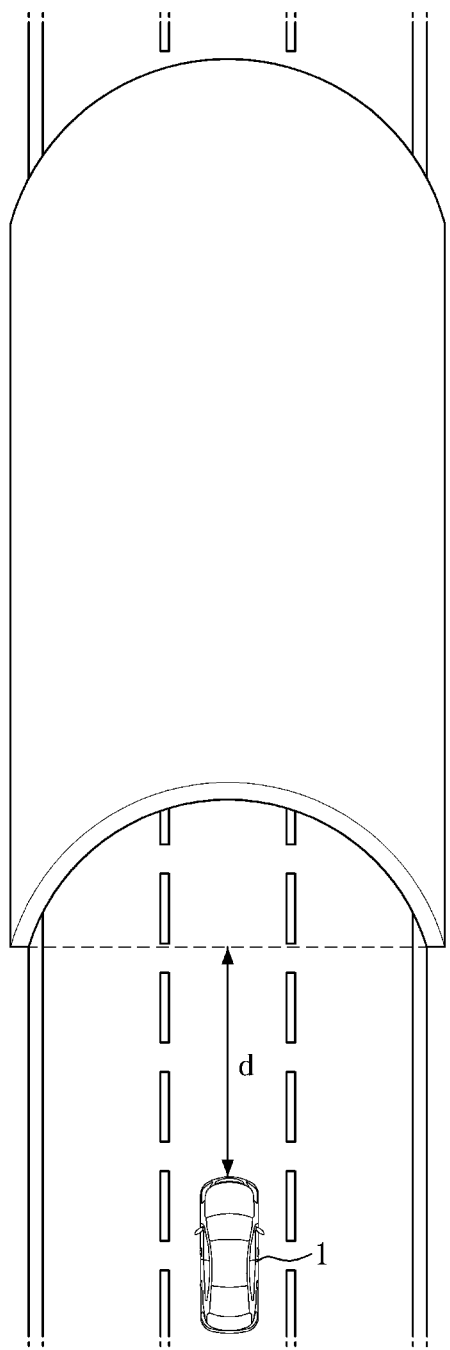
FIG. 5 is a view illustrating a tunnel entry of a vehicle according to an embodiment.

As shown in FIG. 5, the processor 180 may, upon determining that the current position is the position before entering the tunnel, acquire distance information d to the entrance of the tunnel based on the current position information and the map information, and acquire information about an expected time taken to enter the tunnel based on travelling velocity information and the acquired distance information, and upon determining that the estimated time to the entrance of the tunnel at the current position is a preset time based on the acquired estimated time information, control opening of the curtain device 200.

(1.2) The processor 180 may, upon determining that the current position is the position before entering the tunnel, determine whether an on-command of the automatic circulation mode has been received, and upon determining that the on-command of the automatic circulation mode is received, change the outdoor air circulation mode to the indoor air circulation mode, and upon determining that the current position is the position after exiting from the tunnel, change the indoor circulation mode to the outdoor air circulation mode.

The processor 180 may, in response to a change from the outdoor air circulation mode to the indoor air circulation mode, control opening of the curtain device 200, and in response to a change from the indoor air circulation mode to the outdoor air circulation mode, control closing of the curtain device 200.

The processor 180 may, upon determining that the current position is the position before entering the tunnel and the automatic circulation mode is in an off-state, maintain the air circulation mode and control opening of the curtain device 200, and upon determining that the current position is the position after exiting from the tunnel and the automatic circulation mode is in an off-state, maintain the air circulation mode and control closing of the curtain device 200.

(1.3) The processor 180 may, upon determining that the current position is the position before entering the tunnel, determine whether an automatic light on-off command is received, and upon determining that the automatic light on-off command is received, control to turn on the lamp, and upon determining that the position is the position after exiting from the tunnel, control to turn off the lamp.

The processor 180 may control opening of the curtain device 200 in response to the lamp being turned on, and may control closing of the curtain device 200 in response to the lamp being turned off.

The processor 180 may, upon determining that the current position is the position before entering the tunnel and the automatic light on-off mode is in an off state, control turning on/off of the lamp in response to a manipulation signal of the lamp lever. In this case, the processor 180 may control opening of the curtain device 200 when the lamp is turned on in response to the manipulation signal of the lamp lever, and control to maintain the state of the curtain device 200 when the lamp is turned off in response to the manipulation signal of the lamp lever.

(1.4) The processor 180 may determine whether the external illuminance is less than the reference illuminance based on the illuminance information detected by the illuminance sensor, and upon determining that the external illuminance is less than the reference illuminance, control to open the curtain device 200, and upon determining that the external illuminance is higher than or equal to the reference illuminance, control closing of the curtain device 200.

(1.5) The processor 180 may determine whether the current position is a shopping place based on the current position information and the map information, and upon determining that the current position is a shopping position, determine whether the current state is an object loaded state based on image information obtained by the camera 150, and upon determining that the current state is the object loaded state, control closing of the curtain device.

The determining of whether the current position is a shopping place includes determining whether the current position is a mart, a market, or a department store. The object may include a food item.

The processor 180 may determine whether the current position is a shopping place based on the current position information and the map information, and upon determining that the current position is a shopping place, request card usage information from the server and upon receiving the card usage information from the server, check purchase information of food items, and upon determining that there is purchase information of food items, control closing of the curtain device 200.

The processor 180 may also determine whether the current position is a shopping place based on destination information before the ignition is turned off.

The processor 180 may, upon determining that there is purchase information of food items, determine whether the external illuminance is higher than or equal to a reference illuminance based on illuminance information detected by the illuminance sensor, and upon determining that the external illuminance is higher than or equal to the reference illuminance, control closing of the curtain device 200, and upon determining that the external illuminance is less than the reference illuminance, control to maintain the current state of the curtain device 200.

(1.6) The processor 180 may determine whether a passenger in the rear seat is occupied based on seat belt attachment/detachment information, a weight sensor provided in the rear seat, and communication information of the communicator, and upon determining that a passenger in the rear seat exists, determine whether the passenger in the rear seat is in a sleep state based on a biometric signal detected by a biometric sensor provided in the rear seat or a biometric signal received by the communicator, and upon determining that the passenger in the rear seat is in a sleep state, control closing of the curtain device 200.

The processor 180 may, upon determining that the passenger in the rear seat is in a sleep state, determine whether the external illuminance is higher than or equal to a reference illuminance based on the illuminance information detected by the illuminance sensor, and upon determining that the external illuminance is higher than or equal to the reference illuminance, control closing of the curtain device 200 and upon determining that the external illuminance is less than the reference illuminance, control to maintain the current state of the curtain device 200.

The processor 180 extracts a heart rate variable (HRV) signal detected from a pulse sensor of a wearable device 2 or a biometric sensor of a vehicle seat to perform frequency analysis, and decomposes the pulse for each frequency band.

That is, the processor 180 may acquire a frequency component specific signal by performing power spectrum analysis on the HRV signal.

Here, when power spectrum analysis is performed on the HRV signal, the analyzed signal is divided into a low-frequency (L/F) component of less than 0.05 Hz, a medium-frequency (M/F) component between 0.05 and 0.15 Hz, and a high-frequency (H/F) component higher than or equal to 0.15 Hz according to the frequency band.

The low frequency (L/F) component is a component related to body temperature regulation, the medium frequency (M/F) component is a component related to the sympathetic nerve, and the high frequency (H/F) component is a component related to the parasympathetic nerve.

Accordingly, the processor 180 may determine that the user is a sleep state if the high frequency (H/F) component in the HRV signal increases while the detected pulse rate is gradually decreasing.

The processor 180 checks the validity of an electromyograph (EMG) signal to analyze an EMG signal transmitted from an EMG sensor. That is, the processor 180 checks whether the EMG signal indicates a sleep state of a user by checking whether the EMG signal has a change greater than or equal to a preset reference value.

In addition, the preset reference value may be obtained by learning EMG signals through a neural network algorithm. Here, learning in the neural network is a process of setting a weight appropriately such that a node with a desired result has the maximum value.

For example, the EMG signal may output, as a result, a criterion for determining the degree of wrist stiffness and muscle fatigue in a sleep state through a neural network algorithm.

(1.7) The processor 180 may determine whether the shift stage is a reverse stage based on the shift stage information of the shift lever, and upon determining that the shift stage is a reverse stage, control opening of the curtain device 200.

(2) Automatic opening/closing mode-ON+Highway travel assist mode-ON

The processor 180 may determine whether an on-command of the automatic opening/closing mode is received during autonomous driving based on the highway travel assistance mode, and upon determining that the on-command of the automatic opening/closing mode is received, control opening and closing of the curtain device 200 based on at least one of a tunnel entry, an external illuminance, an automatic circulation mode, and an automatic light on-off mode.

(2.1) The processor 180 determines whether the current position is the position before entering a tunnel based on current position information, route information, and road information, and controls opening of the curtain device 200 upon determining that the current position is the position before entering the tunnel, and controls closing of the curtain device 200 upon determining that the current position is the position after exiting from the tunnel.

The processor 180 may, upon determining that the current position is the position before entering the tunnel, acquire distance information to the entrance of the tunnel based on the current position information and the map information, and acquire information about an expected time taken to enter the tunnel based on travelling velocity information and the acquired distance information, and upon determining that the estimated time to the entrance of the tunnel at the current position is a preset time based on the acquired estimated time information, control opening of the curtain device 200.

- (2.2) The processor 180 may, upon determining that the current position is the position before entering the tunnel, determine whether an on-command of the automatic circulation mode has been received, and upon determining that the on-command of the automatic circulation mode is received, change the outdoor air circulation mode to the indoor air circulation mode, and upon determining that the current position is the position after exiting from the tunnel, change the indoor circulation mode to the outdoor air circulation mode.

The processor 180 may, in response to a change from the outdoor air circulation mode to the indoor air circulation mode, control opening of the curtain device 200, and in response to a change from the indoor air circulation mode to the outdoor air circulation mode, control closing of the curtain device 200.

The processor 180 may, upon determining that the current position is the position before entering the tunnel and the automatic circulation mode is in an off-state, maintain the air circulation mode and control opening of the curtain device 200, and upon determining that the current position is the position after exiting from the tunnel and the automatic circulation mode is in an off-state, maintain the air circulation mode and control closing of the curtain device 200.

- (2.3) The processor 180 may, upon determining that the current position is the position before entering the tunnel, determine whether an automatic light on-off command is received, and upon determining that the automatic light on-off command is received, control turning on of the lamp, and upon determining that the position is the position after exiting from the tunnel, control turning off of the lamp.

The processor 180 may control opening of the curtain device 200 in response to the lamp being turned on, and may control closing of the curtain device 200 in response to the lamp being turned off.

The processor 180 may, upon determining that the current position is the position before entering the tunnel and the automatic light on-off mode is in an off state, control turning on/off of the lamp in response to a manipulation signal of the lamp lever. In this case, the processor 180 may control opening of the curtain device 200 when the lamp is turned on in response to the manipulation signal of the lamp lever, and control to maintain the state of the curtain device 200 when the lamp is turned off in response to the manipulation signal of the lamp lever.

- (2.4) The processor 180 may determine whether the external illuminance is less than the reference illuminance based on the illuminance information detected by the illuminance sensor, and upon determining that the external illuminance is less than the reference illuminance, control opening the curtain device 200, and upon determining that the external illuminance is higher than or equal to the reference illuminance, control closing of the curtain device 200.
- (2.5) The processor 180 may predict the day and night based on weather information, date information, and time information, and upon determining that it is a night time, control closing of the curtain device 200 and upon determining that it is a daytime, control opening of the curtain device 200.

(3) Automatic opening/closing mode-OFF

- (3.1) The processor 180 may, upon determining that the automatic opening/closing mode is turned off, while an on-command of the automatic circulation mode is received, change the outdoor air circulation mode to the indoor circulation mode and maintain the state of the curtain device 200 in the current state in response to entering the tunnel, and change the indoor circulation mode to the outdoor air circulation mode and maintain the state of the curtain device 200 in the current state in response to exiting from the tunnel. That is, the processor 180 may, upon determining that the automatic opening/closing mode is turned off while the on-command of the automatic circulation mode is received, maintain the state of the curtain device 200 regardless of the tunnel entry and exit.
- (3.2) The processor 180 may upon determining that an off-command of the automatic opening/closing mode is received while an on-command of the automatic light on/off mode is received, turn on the lamp and maintain the state of the curtain device in the current state in response to the external illuminance being less than the reference illuminance or in response to the position before entering the tunnel, and turn off the lamp and maintain the state of the curtain device in the current state in response to the external illuminance being higher than the reference illuminance or in response to the position after exiting from the tunnel.
- (3.3) The processor 180 may, in a state in which a manual opening/closing command is received (that is, a state in which the automatic opening/closing mode is turned off) control closing of the curtain device in response to a user input regardless of the illuminance information detected by the illuminance sensor.

The processor 180 may include a memory (not shown) for storing data regarding an algorithm for controlling the operations of the components of the vehicle 1 or a program that represents the algorithm, and a processor (not shown) that performs the above-described operations using the data stored in the memory. In this case, the memory and the processor may be implemented as separate chips. Alternatively, the memory and the processor may be implemented as a single chip.

The memory 181 stores map information, and stores information about the reference illuminance, the preset distance, and the preset time.

The memory 181 may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random-access memory (RAM), or other storage media, such as a hard disk drive (HDD), a CD-ROM, and the like, but the implementation of the memory 181 is not limited thereto.

The storage may be a memory implemented as a chip separated from the processor, or may be implemented as a single chip integrated with the processor.

The communicator 190 may communicate with an external device.

The external device may include a server providing card payment information and a user terminal.

The communicator 190 may, in order to obtain current position information of the vehicle, include a position receiver configured to receive satellite position information and obtain current position information of the vehicle based on the received satellite position information.

The position receiver may include a global positioning system (GPS) receiving device that communicates with a plurality of satellites to calculate the position of the vehicle.

The position receiver includes a GPS signal receiver and a signal processor for processing the GPS signal acquired by the GPS signal receiver. Here, the GPS signal receiver includes an antenna for receiving signals from a plurality of GPS satellites. The antenna may be provided on the exterior of the vehicle.

The signal processor of the position receiver includes software for obtaining a current position using distance corresponding to position signals of a plurality of GPS satellites and time information, and an outputter for outputting the obtained vehicle position information.

The communicator 190 may communicate with various electronic devices in the vehicle.

The communicator 190 may communicate with other vehicles, infrastructure, and servers.

The communicator 190 further includes an antenna for performing a wireless vehicle network (Vehicle to everything: V2X) such as communication with other vehicles (V2V) and communication with infrastructure (V2I).

The communicator 190 may include one or more components that enable communication with an external device, and may include, for example, at least one of a short-range communication module, a wired communication module, or a wireless communication module.

The short-range communication module may include various short-range communication modules that transmit and receive signals using a wireless communication network in a short range, such as a Bluetooth module, an infrared communication module, a radio frequency identification (RFID) communication module, a wireless local access network (WLAN) communication module, an NFC communication module, and a Zigbee communication module.

The wired communication module may include various wired communication modules, such as a controller area network (CAN) communication module, a local area network (LAN) module, a wide area network (WAN) module, or a value added network communication (VAN) module, and various cable communication modules, such as a universal serial bus (USB) module, a high definition multimedia interface (HDMI) module a digital visual interface (DVI) module, a recommended standard-232 (RS-232) module, a power line communication module, or a plain old telephone service (POTS) module.

The wireless communication module may include wireless communication modules supporting various wireless communication methods, such as a Wi-fi module, a wireless broadband module (Wibro) module, a global system for mobile communication (GSM) module, a code division multiple access (CDMA) module, a wideband code division multiple access (WCDMA) module, a universal mobile telecommunications system (UMTS) module, a time division multiple access (TDMA) module, a long term evolution (LTE) module, and the like.

The user terminal that communicates with the communicator of the vehicle may be implemented as a computer or a portable terminal that may be connected to the vehicle through a network.

Here, the computer may include, for example, a notebook computer, a desktop computer, a laptop PC, a tablet PC, a slate PC, and the like, each of which is equipped with a WEB Browser. The portable terminal is a wireless communication device ensuring portability and mobility, and may include: all types of handheld based wireless communication devices, such as a personal communication system (PCS), a global system for mobile communications (GSM), a personal digital cellular (PDC), a personal handy phone system (PHS), a personal digital assistant (PDA), an international mobile telecommunication (IMT)-2000, a code division multiple access (CDMA)-2000, a w-code division multiple access (W-CDMA), a wireless broadband internet (WiBro) terminal, a smart Phone, and the like; and wearable devices, such as a watch, a ring, a bracelet, an ankle bracelet, a necklace, glasses, a contact lens, or a head-mounted-device (HMD).

The wearable device 2 may include various devices that the user may wear on the body or clothing.

The wearable device 2 may be, for example, a smart watch, a smart band, a wearable computer, google glasses, a Bluetooth headset, or smart wear.

Figure 6:
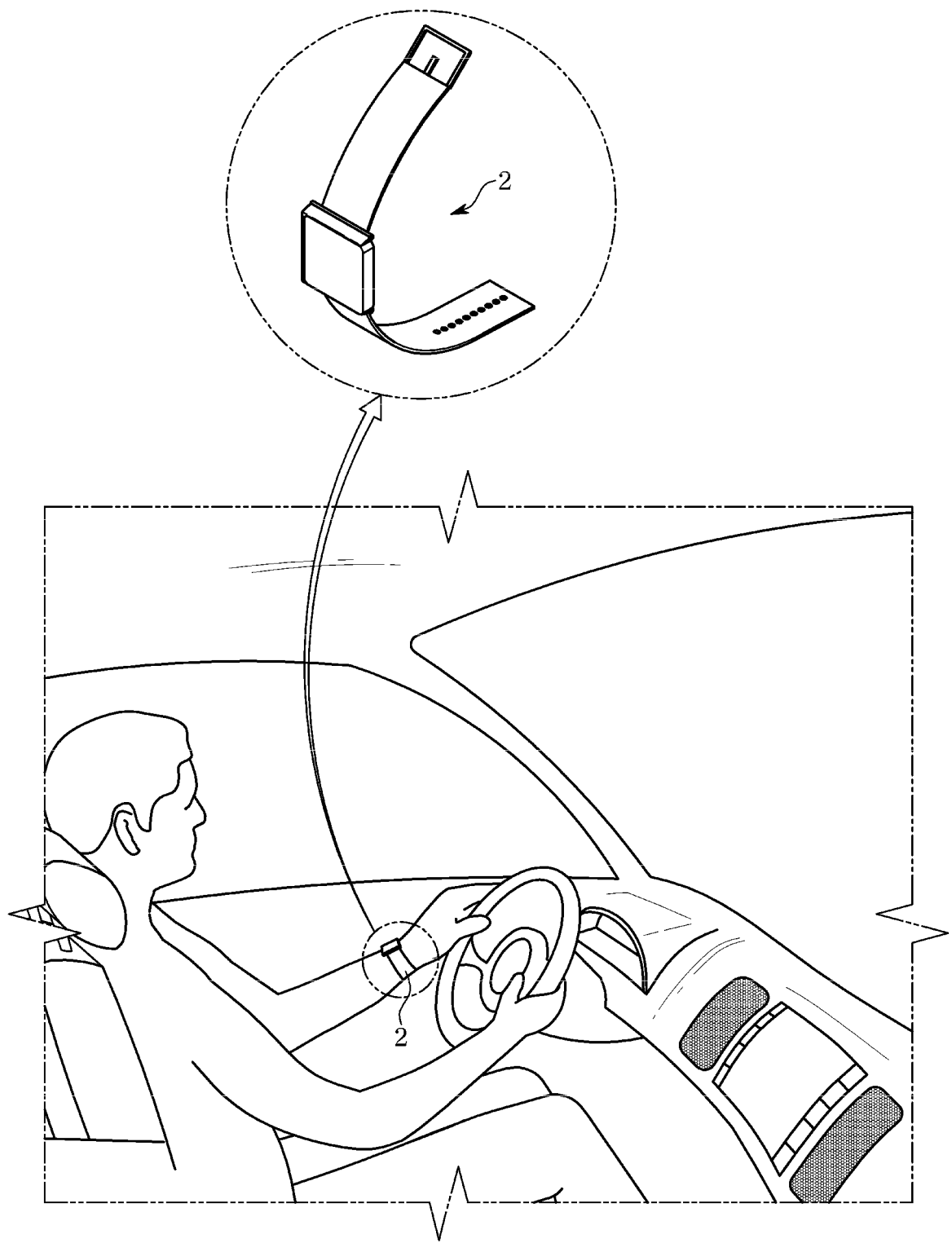
FIG. 6 is a view illustrating a user terminal performing communication with a vehicle according to an embodiment.

As shown in FIG. 6, the wearable device 2 may be located inside the vehicle 1 while being worn on the user's body, and may communicate with the vehicle 1.

The wearable device 2 may detect various biometric states related to the user's body, and may determine drowsy driving using the detected information.

The wearable device 2 may request the vehicle to perform a specific function by performing wired or wireless communication with the vehicle.

In addition, the wearable device 2 may transmit at least one of image information or sound information output from the wearable device 2 to the terminal 140 provided in the vehicle through communication.

The wearable device 2 includes a biometric sensor that detects the user's biometric information.

Here, the biometric information may include movement information of the user and biometric response information generated in the user's body when the user sleeps.

The biometric sensor may include a motion sensor that detects a user's movement and a biometric sensor that detects a biometric response about the user's sleep.

The motion sensor may include at least one of an acceleration sensor, a gravity sensor, and a gyro sensor, and the biometric sensor may include a pulse sensor (or a heart rate sensor) for detecting the user's pulse or an EMG sensor for detecting the user's EMG.

Here, the pulse sensor may include an optical sensor, an electrode sensor, or an acceleration sensor.

The optical sensor emits light to the wrist using a light emitting diode (LED) having a specific frequency spectrum (i.e., infrared) and outputs a reflected signal incident onto a phototransistor.

The electrode sensor outputs a signal according to a change in electric potential of a human generated by an electrode adjacent to the wrist.

The acceleration sensor outputs a signal for the ballistocardiogram (BCG), which is a movement of the wrist according to a physical movement of the heart.

The EMG sensor includes an electrode, and outputs a signal for an action potential of a muscle generated in the muscle of the wrist using the electrode.

The curtain device 200 has been described with reference to FIG. 3, and the same description will be omitted in FIG. 4.

The components shown in FIG. 4 may refer to a software component and/or a hardware component, such as a Field Programmable Gate Array (FPGA) and an Application Specific Integrated Circuit (ASIC).

At least one component may be added or omitted to correspond to the performance of the components of the vehicle shown in FIG. 4. In addition, the mutual positions of the components may be changed to correspond to the performance or structure of the system.

Figure 7:
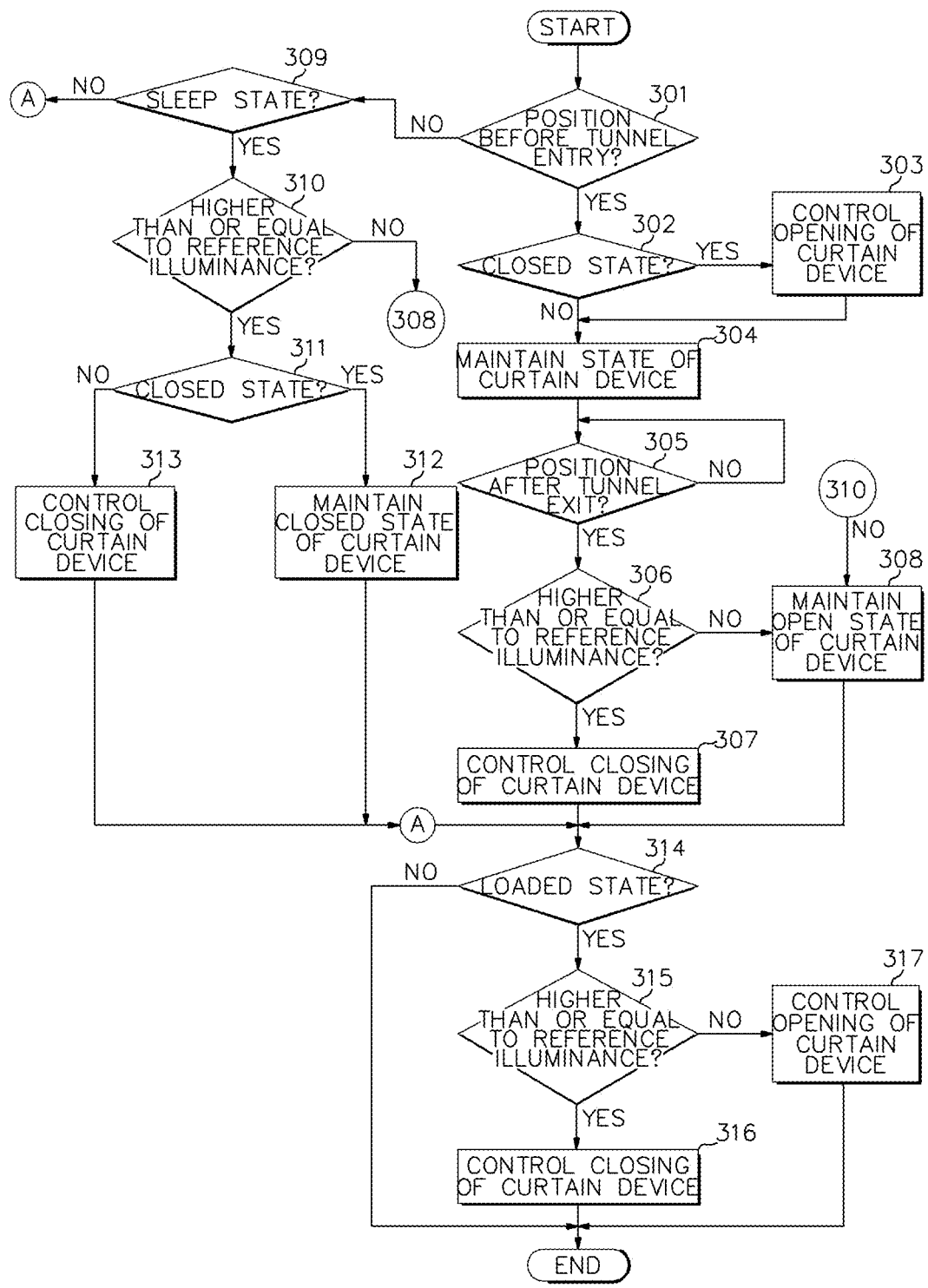
FIG. 7 is a control flowchart of a vehicle according to an embodiment.

FIG. 7 is a control flowchart of a vehicle according to an embodiment.

The vehicle generates route information from the current position to the destination based on current position information received by the position receiver and destination information input to the inputter, and generates navigation information based on the generated route information and road information.

The vehicle may display map information, to which the navigation information and the current position information are matched, through the terminal 140.

The vehicle may, when travelling in an autonomous driving mode, travel based on the generated navigation information, at a target travelling velocity. Here, the target travelling velocity may be a preset travelling velocity or a travelling velocity input by a user.

The vehicle may, when travelling in an autonomous driving mode, acquire image data of the road through the imaging device and acquire radar data, which is obstacle data, through the obstacle detector, may recognize obstacles based on the image data and the radar data, and travel while avoiding obstacles.

The vehicle determines whether an on-command of the automatic opening/closing mode is received during manual travelling or autonomous driving, and upon determining that the on-command of the automatic opening/closing mode is received, control opening and closing of the curtain device 200 based on the tunnel entry, the external illumination, the sleep state, and the loading state.

The vehicle may, during manual driving or autonomous driving, determine whether the current position is at a position before entering the tunnel based on the current position information, the route information, and the road information (301), and upon determining that the current position is at a position before entering the tunnel, obtain distance information to the entrance of the tunnel based on the current position information and the position information of the entrance of the tunnel.

The vehicle may, when determining whether the current position is at a position before entering the tunnel, further include checking the position information of the entrance of the tunnel in the road information.

More specifically, the vehicle acquires information about an expected time taken to reach the entrance of the tunnel based on travelling velocity information detected by the travelling information detector and the acquired distance information, and upon determining that the estimated time to the entrance of the tunnel at the current position is a preset time based on the acquired estimated time information, check the state of the curtain device and determine whether the checked state of the curtain device is a closed state (302).

The vehicle may, upon determining that the state of the curtain device is in a closed state, control opening of the curtain device (303), and upon determining that the curtain device is not in a closed state, determine that the state of the curtain device is in an open state, and maintain the state of the curtain device (304).

The vehicle determines whether the current position is at a position after exiting from the tunnel based on the current position information, the route information, and the road information (305), and upon determining that the current position is at a position after exiting from the tunnel, determine whether the external illuminance is higher than or equal to the reference illuminance (306), and upon determining that the external illuminance is higher than or equal to the reference illuminance, controls closing of the curtain device (307) and upon determining that the external illuminance is less than the reference illuminance, maintain the state of the curtain device in the open state (308).

That is, the vehicle may, upon determining that the external illuminance is less than the reference illuminance, control the curtain device to be kept in an open state.

The vehicle may, when determining whether the vehicle is in the position after exiting from the tunnel, include checking position information of the exit of the tunnel in the road information.

The vehicle may, upon determining that the current position is not the position before entering the tunnel while travelling, determine whether an occupant is present in the rear seat based on the detection information of the occupant sensor (not shown) provided on the seat, and upon determining that the occupant is present in the rear seat, detect biometric signals of the occupant in the rear seat.

The vehicle may control the communicator to determine whether communication is performable with a terminal carried by the occupant in the rear seat, and upon determining that communication with the terminal carried by the occupant in the rear seat is performable, determine that the occupant is present in the rear seat.

The vehicle may determine whether the occupant is present in the rear seat by checking identification information of the terminal, or based on the strength of the communication signal.

The vehicle may also receive biometric signals transmitted from the terminal of the occupant in the rear seat.

The vehicle determines whether the occupant of the rear seat is sleeping based on the biometric signals transmitted from the terminal or the biometric signals of the biometric sensor provided in the rear seat (309).

The vehicle may, upon determining that the occupant in the rear seat is in a sleeping state, determine whether the external illuminance is higher than or equal to the reference illuminance based on illuminance information detected through the illuminance sensor (310), determine whether the curtain device is in a closed state (311).

The vehicle may, upon determining that the state of the curtain device is in a closed state, maintain the state of the curtain device in the closed state (312), and upon determining that the state of the curtain device is not in a closed state, control the curtain device to enter a closed state (313).

The vehicle may, while not in a state of the tunnel entry or the sleeping state, determine whether the current position is a shopping place based on the current position information and the map information, and upon determining that the current position is a shopping place, determine whether the current state is an object loaded state based on image information obtained by the camera 150 (314).

The determining of whether the current position is a shopping place includes determining whether the current position is a mart, a market, or a department store. The object may include a food item.

The vehicle may also determine whether the current position is a shopping place based on destination information before the ignition is turned off.

The vehicle may, upon determining that the current position is a shopping place, request card usage information from the server and upon receiving the card usage information from the server, check purchase information of food items, and upon determining that there is purchase information of food items, determine that the current state is an object loaded state.

The processor 180 may, upon determining that the current state is an object loaded state, determine whether the external illuminance is higher than or equal to the reference illuminance based on illuminance information detected by the illuminance sensor (315), and upon determining that the external illuminance is higher than or equal to the reference illuminance, determine the state of the curtain device. In this case, the vehicle may, upon determining that the curtain device is in a closed state, maintain the state of the curtain device and upon determining that the curtain state is in an open state, control closing of the curtain device (316).

The vehicle may, upon determining that the external illuminance is less than the reference illuminance, determine the state of the curtain device, and upon determining that the curtain device is in an open state, maintain the state of the curtain device and upon determining that the curtain state is in a closed state, control opening of the curtain device (317).

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read only Memory (ROM), a Random-Access Memory (RAM), a magnetic tape, a magnetic disk, a flash memory, an optical data storage device, and the like.

As is apparent from the above, the present disclosure can secure a rear view of the driver by automatically opening the curtain device during travel at night or travel in a tunnel, thereby improving the travelling safety of the vehicle and user convenience, and preventing accidents.

The present disclosure can enable the user to sleep by automatically closing the curtain device based on biometric information of the user, thereby preventing drowsy travelling.

The present disclosure can prevent deterioration of food items loaded in the vehicle by automatically closing the curtain device in a state in which the food items are loaded.

As described above, the present disclosure can improve the quality and marketability of the vehicle, improve user satisfaction, and furthermore secure the competitiveness of the product.

Although embodiments of the present disclosure have been described for illustrative purposes, those skilled in the art will appreciate that various modifications, additions and substitutions are possible, without departing from the scope and spirit of the disclosure. Therefore, embodiments of the present disclosure have not been described for limiting purposes.

What is claimed is:

1. A vehicle comprising:
  a curtain device;
  a communicator configured to recognize current position information; and
  a processor configured to determine whether a current position is a position before entering a tunnel based on the current position information and map information, and control the opening the curtain device, upon determining that the current position is the position before entering the tunnel,
  an inputter; and
  a velocity detector configured to detect a travelling velocity and to output velocity information regarding the detected travelling velocity, wherein the processor is configured to
    generate route information from the current position to a destination based on destination information input to the inputter and the current position information,
    determine whether the current position is the position before entering the tunnel based on the generated route information, the current position information, and the map information,
    upon determining that the current position is the position before entering the tunnel, acquire distance information regarding a distance to an entrance of the tunnel based on the current position information and the map information,
    acquire expected time information taken to reach the entrance of the tunnel based on the velocity information and the acquired distance information, and
    control opening of the curtain device based on the acquired expected time information.

2. The vehicle of claim 1, wherein the processor is configured to:
  upon a selection command for an autonomous driving mode being received through the inputter; determine whether the current position is a highway based on the route information, the map information, and the current position information; and upon determining that the current position is the highway, control to execute autonomous driving and change an opening/closing mode of the curtain device to an automatic opening/closing mode during the autonomous driving.

3. The vehicle of claim 1, further comprising the inputter, wherein the processor is configured to, upon a selection command of an automatic light on/off mode for automatically turning on a lamp being received through the inputter, change an opening/closing mode of the curtain device to an automatic opening/closing mode.

4. The vehicle of claim 1, further comprising the inputter, wherein the processor is configured to, upon an automatic circulation mode for automatically changing a circulation mode of an air conditioner being received through the inputter, change an opening/closing mode of the curtain device to an automatic opening/closing mode, and
  wherein the circulation mode of the air conditioner includes an indoor air circulation mode and an outdoor air circulation mode.

5. The vehicle of claim 1, further comprising the inputter and an illuminance sensor,
  wherein the processor is configured to
  upon a selection command of an automatic opening/closing mode of the curtain device being received through the inputter, determine whether an external illuminance is less than a reference illuminance based on illuminance information detected by the illuminance sensor, and upon determining that the external illuminance is less than the reference illuminance, control opening of the curtain device.

6. The vehicle of claim 5, further comprising a biometric sensor, wherein the processor is configured to determine whether a user is in a sleep state based on a biometric signal detected by the biometric sensor, and upon determining that the user is in the sleep state, determine whether the external illuminance is higher than or equal to the reference illuminance based on the illuminance information detected by the illuminance sensor, and upon determining that the external illuminance is higher than or equal to the reference illuminance, control closing of the curtain device.

7. The vehicle of claim 1, wherein the processor is configured to, upon a signal of a shift lever being received, determine a shift stage corresponding to the signal of the shift lever, and upon determining that the shift stage is a reverse stage, control opening of the curtain device.

8. The vehicle of claim 1, further comprising a camera, wherein the processor is configured to determine whether the current position is a shopping place based on the current position information;

upon determining that the current position is the shopping place, determine whether a food item is loaded based on image information of the camera; and in response to a state in which the food item is loaded, control closing of the curtain device.

9. The vehicle of claim 1, wherein the processor is configured to determine whether a current time is a day time or a night time based on date information and time information, and upon determining that the current time is the night time, control opening of the curtain device.

10. A vehicle comprising:

a curtain device;

a lamp;

an inputter; and a processor configured to, upon a selection command of an automatic light on/off mode for automatically turning on the lamp being received through the inputter, change an opening/closing mode of the curtain device to an automatic opening/closing mode, and upon the lamp being in a light on-state, control opening of the curtain device.

11. The vehicle of claim 10, further comprising a communicator for acquiring current position information, wherein the processor is configured to determine whether a current position is a position before entering a tunnel based on the current position information and map information, and upon determining that the current position is the position before entering the tunnel, control to open the curtain device.

12. The vehicle of claim 11, further comprising an air conditioner for performing an indoor air circulation mode and an outdoor air circulation mode, wherein the processor is configured to, upon determining that the current position is the position before entering the tunnel, change an air circulation mode of the air conditioner from the outdoor air circulation mode to the indoor air circulation mode.

13. The vehicle of claim 11, wherein the processor is configured to, upon an automatic opening/closing command of the curtain device being received through the inputter, control opening of the curtain device in response to the lamp being turned on, and control closing of the curtain device in response to the lamp being turned off.

14. The vehicle of claim 10, further comprising an illuminance sensor configured to detect an illuminance and to output illuminance information related to the detected illuminance, wherein the processor is configured to, upon an automatic opening/closing command of the curtain device being received through the inputter, determine whether the detected illuminance is less than a reference illuminance based on the illuminance information detected by the illuminance sensor, and upon determining that the detected illuminance is less than the reference illuminance, control opening of the curtain device.

15. The vehicle of claim 10, further comprising a biometric sensor, wherein the processor is configured to determine whether a user is in a sleep state based on a biometric signal detected by the biometric sensor, upon determining that the user is in the sleep state, determine whether an external illuminance is higher than or equal to a reference illuminance based on illuminance information detected by an illuminance sensor, and upon determining that the external illuminance is higher than or equal to the reference illuminance, control closing of the curtain device.

16. The vehicle of claim 10, wherein the processor is configured to, upon a signal of a shift lever being received, determine a shift stage corresponding to the signal of the shift lever, and upon determining that the shift stage is a reverse stage, control opening of the curtain device.

17. The vehicle of claim 10, further comprising a camera, wherein the processor is configured to:

determine whether a food item is loaded based on image information of the camera; and in response to a state in which the food item is loaded, control closing of the curtain device.

18. The vehicle of claim 10, further comprising a communicator for acquiring current position information, wherein the processor is configured to, upon a selection command for an autonomous driving mode being received through the inputter, determine whether a current position is a highway based on map information, and the current position information, and upon determining that the current position is the highway, control to execute autonomous driving, and change the opening/closing mode of the curtain device to the automatic opening/closing mode upon the autonomous driving.

* * * * *